United States Patent
Devroe

(10) Patent No.: US 9,103,591 B2
(45) Date of Patent: Aug. 11, 2015

(54) METHOD FOR PRODUCING CEMENT CLINKER IN A PLANT, AND PLANT FOR PRODUCING CEMENT CLINKER AS SUCH

(75) Inventor: Sebastien Devroe, Bouvines (FR)

(73) Assignee: FIVES FCB, Villeneuve d'Ascq (FR)

( * ) Notice: Subject to any disclaimer, the term of this patent is extended or adjusted under 35 U.S.C. 154(b) by 357 days.

(21) Appl. No.: 13/382,001

(22) PCT Filed: Jun. 30, 2010

(86) PCT No.: PCT/FR2010/000478
§ 371 (c)(1),
(2), (4) Date: Feb. 15, 2012

(87) PCT Pub. No.: WO2011/001044
PCT Pub. Date: Jan. 6, 2011

(65) Prior Publication Data
US 2012/0132112 A1    May 31, 2012

(30) Foreign Application Priority Data
Jul. 2, 2009 (FR) ...................................... 09 03250

(51) Int. Cl.
*F27B 7/20* (2006.01)
*C04B 7/43* (2006.01)
*C04B 2/10* (2006.01)

(52) U.S. Cl.
CPC ................. *F27B 7/205* (2013.01); *C04B 7/432* (2013.01); *C04B 7/434* (2013.01); *C04B 2/10* (2013.01); *C04B 7/43* (2013.01)

(58) Field of Classification Search
CPC ........ Y02C 10/04; C04B 7/364; C04B 7/367; C04B 2/10; C04B 7/365; C04B 7/38; C04B 7/43; C04B 7/432; F27B 7/2033; F27B 15/02; F27B 7/20; F27B 7/38; F27B 17/00; F27B 7/2016; F27B 7/2041; F27B 7/00
USPC ..................... 106/750, 761, 771; 432/14, 106
See application file for complete search history.

(56) References Cited

U.S. PATENT DOCUMENTS 3,895,955 A * 7/1975 Kondo et al. .................. 106/744
4,017,253 A * 4/1977 Wielang et al. ................. 432/58
(Continued)

FOREIGN PATENT DOCUMENTS

DE    132 733    10/1978
EP    0 464 631    1/1992
(Continued)

OTHER PUBLICATIONS

"Workshop on Carbon Dioxide Capture and Storage"; Intergovernmental Panel on Climate Change; Nov. 2002 [Retrieved on May 30, 2013]. Retrieved from http://www.climatescience.gov/Library/ipcc/ccs02-workshop_proceedings.pdf.*

(Continued)

*Primary Examiner* — Kaj K Olsen
*Assistant Examiner* — Karam Hijji
(74) *Attorney, Agent, or Firm* — Young & Thompson

(57) ABSTRACT

A method for producing cement clinker in a plant that includes: a first cyclone preheater and a second cyclone preheater for preheating first and second portions of a raw material, respectively; a precalcinator using a combustion gas for burning a fuel, the fumes released by the precalcinator being directed to the second cyclone preheater; a rotary furnace provided with a fuel burner, the fumes released by the rotary furnace being directed to the first cyclone preheater; and a clinker cooler that blows cooling air across the clinker at the outlet of the rotary furnace. According to the method, the precalcinator combustion gas contains between 90 and 100 vol % of oxygen. The precalcinator may consist of a fluidized bed, the fluidization gas being the combustion gas. The invention also relates to a plant as such.

13 Claims, 1 Drawing Sheet

(56) References Cited

U.S. PATENT DOCUMENTS

| | | | |
|---|---|---|---|
| 4,388,067 A * | 6/1983 | Christiansen | 432/14 |
| 4,402,667 A | 9/1983 | Goldmann | |
| 4,504,319 A * | 3/1985 | Wolter et al. | 106/767 |
| 5,193,997 A | 3/1993 | Aoyama et al. | |
| 6,749,681 B1 * | 6/2004 | Burdis et al. | 106/744 |
| 8,187,374 B2 | 5/2012 | Penfornis et al. | |
| 2010/0037804 A1 | 2/2010 | Paxton et al. | |

FOREIGN PATENT DOCUMENTS

| | | |
|---|---|---|
| EP | 1 923 367 | 5/2008 |
| FR | 2 281 792 | 3/1976 |
| JP | S49117517 A | 11/1974 |
| WO | 2008056068 A1 | 5/2008 |

OTHER PUBLICATIONS

International Search Report dated Sep. 7, 2010 corresponding to PCT/FR2010/000478.

Translation of Japanese Office Action, dated Jan. 28, 2014, from corresponding JP application.

* cited by examiner

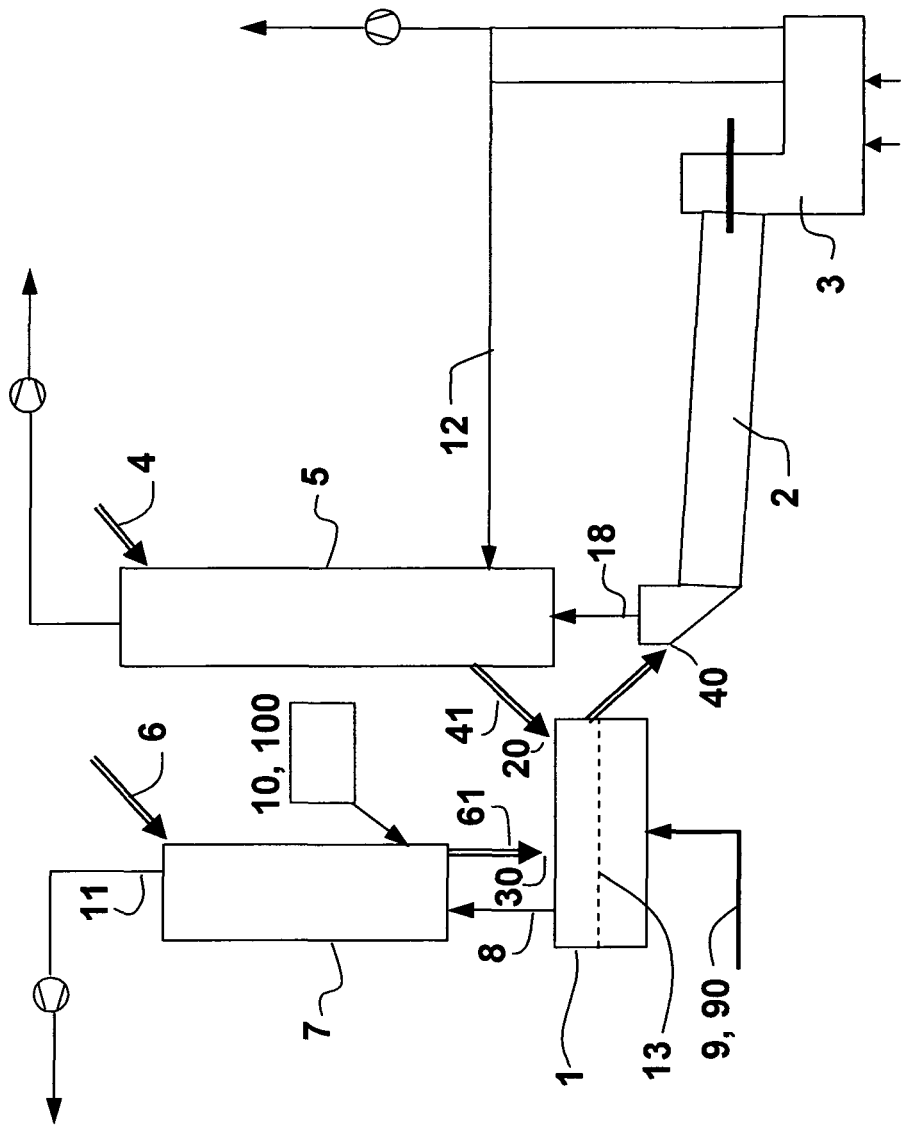

METHOD FOR PRODUCING CEMENT CLINKER IN A PLANT, AND PLANT FOR PRODUCING CEMENT CLINKER AS SUCH

The invention relates to a method for manufacturing cement clinker in a facility, and a facility for manufacturing such cement clinker.

Cement manufacture generally uses a fired material, clinker, which is produced from minerals, the main constituent whereof is calcium carbonate.

The preparation of clinker involves a firing operation which produces large quantities of carbon dioxide, both through the decomposition of calcium carbonate and through the combustion of the fuel required for the operation.

The production of one tonne of Portland cement is thus accompanied by the emission of approximately 530 kg of $CO_2$ from the processed material and 250 to 300 kg of $CO_2$ from the fuel. This carbon dioxide is released in the fumes, at a concentration less than 30%, the main constituent of the fumes being nitrogen. Under these conditions, carbon dioxide is difficult to isolate and sequester.

The manufacture of cement clinker generally uses a so-called dry process firing method, wherein the raw materials, previously ground in dust form, are roasted in a rotary furnace. In order to reduce the energy requirements of the operation, exchangers have been added upstream and downstream from the rotary furnace, and directly recover the heat contained in the materials and the fumes from the furnace.

Upstream, a cyclone preheater is found, wherein the raw material is preheated in suspension, and partially decarbonated. Downstream, a clinker cooler is found, wherein the fired material is cooled by blowing cold air.

The majority of facilities operating using a dry process include a combustion reactor below the preheater, referred to as a precalcinator, wherein a significant proportion of the fuel used by the facility is fed, and wherein the calcium carbonate containing the suspended material carries out a large proportion of the decarbonation reaction thereof.

One method for increasing the $CO_2$ concentration in the combustion fumes would consist of preventing the dilution of the combustion gas with nitrogen using an oxygen-enriched gas flow to supply the precalcinator. The generated fume volume would thus be reduced relative to a conventional air supply, the gas flow in the precalcinator however becoming insufficient for the satisfactory aeraulic operation of the precalcinator. In order to remedy this constraint, a portion of the fumes from the preheater or from the precalcinator is recycled to the precalcinator, resulting in an increase in thermal expenditure. Such a method is thus known from the document EP-1.923.367 wherein the precalcinator is fed with an oxygen-enriched gas and by recycling a portion of the fumes produced by the precalcinator.

Some facilities include two preheaters, one receiving the fumes from the furnace and a portion of the material to be processed before routing said materials to the precalcinator, and the other receiving the fumes from the precalcinator and the other portion of the materials to be processed. Since the precalcinator receives the majority of the fuel from the facility, and since the majority of the decarbonation of the material occurs in the precalcinator, more than 75% of the carbon dioxide is contained in the fumes from the second preheater.

The aim of the invention consists, in a facility of the type described above, i.e. having two preheaters, of significantly increasing the carbon dioxide concentration in the fumes from the second preheater associated with the precalcinator, and thus facilitating the sequestration of the majority of the carbon dioxide generated in the facility.

More specifically, the aim of the present invention is that of proposing a facility for concentrating $CO_2$, without increasing the thermal expenditure.

A further aim of the invention is that of not substantially modifying the method generally used for producing cement clinker.

A further aim of the invention is that of not substantially modifying the thermal consumption of the facility and thus preventing that the aim of sequestering carbon dioxide is accompanied by an increase in carbon dioxide production following an increase in thermal consumption.

The invention firstly relates to a method for manufacturing cement clinker in a facility comprising:
  a first cyclone preheater and a second cyclone preheater for preheating first and second portions of a raw material, respectively,
  a precalcinator using a combustion gas for burning a fuel, the fumes released by the precalcinator being directed to said second cyclone preheater,
  a rotary furnace provided with a fuel burner, the fumes released by the rotary furnace being directed to said first cyclone preheater,
  a clinker cooler that blows a cooling gas across the clinker at the outlet of the rotary furnace, wherein:
  the first portion of raw material is preheated in the first cyclone preheater,
  the second portion of raw material is preheated in the second cyclone preheater,
  the first preheated portion of raw material and the second preheated portion of raw material are pre-roasted in the precalcinator before firing the pre-roasted materials in the rotary furnace and cooling the fired materials in the clinker cooler.

According to the method according to the invention:
  the combustion gas in the precalcinator contains between 90% and 100% oxygen by volume,
  the precalcinator is a fluidised bed, the fluidisation gas being said combustion gas,
  the materials are pre-roasted in the precalcinator, without recycling the fumes in said precalcinator.

According to further optional features taken alone or in combination:
  the fuel intended for the precalcinator is mixed with the preheated materials before introducing said preheated materials into said precalcinator;
  the fluidisation gas velocity is less than 2 m/s;
  the dwell time of the materials in the precalcinator is greater than 1 minute and less than 20 minutes;
  the grain size of the fuel is greater than or equal to 1 mm, in part or in whole;
  the carbon dioxide is captured from the fumes at the outlet of the second cyclone preheater;
  a portion of the fumes from the second cyclone preheater is used as a pneumatic transport fluid for solid fuels and/or as a spraying fluid for liquid fuels or as a cleaning fluid in said second preheater.

The invention also relates to a facility for manufacturing cement clinker comprising:
  a first cyclone preheater and a second cyclone preheater for preheating first and second portions of a raw material, respectively,
  a precalcinator, the fumes released by said precalcinator being directed to said second cyclone preheater, the precalcinator having an inlet for the materials preheated in said first cyclone preheater and an inlet for the materials preheated in the second cyclone preheater, a rotary furnace provided with a fuel burner, the fumes released by the rotary furnace being directed to said first cyclone preheater, said rotary furnace having an inlet for the materials roasted in the precalcinator, a clinker cooler that blows a cooling gas at the outlet of said rotary furnace.

The facility according to the invention comprises means for supplying said precalcinator with a combustion gas containing between 90% and 100% oxygen by volume, and wherein the precalcinator is a fluidised bed, said combustion gas being the fluidisation gas.

According to one embodiment, the facility has, upstream from said precalcinator, means for mixing the preheated materials with a fuel.

The invention will be understood more clearly on reading the following description accompanied by the single FIGURE illustrating an embodiment of the invention.

The invention relates to a method for manufacturing cement clinker in a facility comprising:
  a first cyclone preheater 5 and a second cyclone preheater 7 for preheating first 4 and second 6 portions of a raw material, respectively,
  a precalcinator 1 using a combustion gas 9 for burning a fuel, the fumes 8 released by said precalcinator 1 being directed to said second cyclone preheater 7,
  a rotary furnace 2 provided with a fuel burner, the fumes 18 released by the rotary furnace being directed to said first cyclone preheater 5,
  a clinker cooler 3 that blows a cooling gas at the outlet of said rotary furnace 2.

According to the method:
  the first portion 4 of raw material is preheated in the first cyclone preheater 5,
  the second portion 6 of raw material is preheated in the second cyclone preheater 7,
  the first preheated portion of raw material 41 and the second preheated portion of raw material 61 are pre-roasted in the precalcinator 1 before firing the pre-roasted materials in the rotary furnace and cooling the fired materials in said clinker cooler.

According to the invention, the combustion gas 9 in the precalcinator 1 has an oxygen concentration between 90% and 100%.

Advantageously, the precalcinator 1 is a fluidised bed 13, the fluidisation gas being said combustion gas. The velocity of the fluidisation gas may be less than 2 m/s.

The low gas velocities prevailing in the fluidised bed, lower than in entrained flow precalcinators according to the prior art, enable precalcination without recycling the fumes in the precalcinator, said recycling generally being encountered in facilities wherein it is sought to concentrate $CO_2$, in order to sequester same (i.e. EP 1.923.367). The dwell time of the materials in the precalcinator may be greater than 1 minute and less than 20 minutes. This dwell time is markedly greater than the dwell time of the materials of said entrained flow precalcinators according to the prior art. These long dwell times will particularly enable the use of fuels having grain sizes greater than or equal to 1 mm, fuels having a lower cost compared to the fuels having much lower grain sizes used in entrained flow precalcinators in prior art facilities.

This fuel 10 intended for the precalcinator 1 may be mixed with preheated materials. More specifically, according to the example in FIG. 1, the fuel 10 is mixed with the second portion 61 of the preheated materials before introducing said preheated materials 61 into the precalcinator 1. The fuel 10 is thus mixed with the material before being introduced into the fluidised bed.

In this way, combustion is carried out evenly and the heat generated by the combustion is consumed as it is produced in the material decarbonation reaction, such that the temperature remains within the range defined by the decarbonation reaction, i.e. at a value below 950° C.

The quantity of the second portion 6 of material (dust) introduced into the second preheater 7 is adapted to the quantity of fumes such that suitable aeraulic operation is obtained in said second preheater 7. As a non-limiting example, the first portion 4 of the raw materials represents approximately to 70% of the raw material and the portion of the raw materials 6 represents 30 to 40% of the raw material. In order to obtain satisfactory aeraulic operation in the first cyclone preheater 5, a portion of the air heated by the fired materials in said clinker cooler 3 may be directed into the first cyclone preheater 5 particularly via the pipe 12.

The carbon dioxide from the fumes 11 is captured at the outlet of the second cyclone preheater 7. The carbon dioxide concentration is largely greater than 75% (by volume).

A portion of the fumes 11 from the second cyclone preheater 7 may be used as a pneumatic transport fluid for solid fuels and/or as spraying fluids for liquid fuels or as cleaning fluids in said second preheater 7.

The invention also relates to a facility for manufacturing cement clinker particularly suitable for implementing the method.

This facility comprises:
  a first cyclone preheater 5 and a second cyclone preheater 7 for preheating first and second portions of a raw material 6, respectively,
  a precalcinator 1, the fumes 8 released by said precalcinator 1 being directed to said second cyclone preheater 7, said precalcinator 1 having an inlet 20 for the material preheated in the first cyclone preheater 5 and an inlet 30 for the material preheated in said second cyclone preheater 7,
  a rotary furnace 2 provided with a fuel burner, the fumes 18 released by the rotary furnace 2 being directed to said first cyclone preheater 5, said rotary furnace 2 having an inlet 20 for the materials roasted in said precalcinator 1,
  a clinker cooler 3 that blows a cooling gas at the outlet of said rotary furnace 2.

According to the invention, the facility comprises means 90 for supplying said precalcinator 1 with a combustion gas containing between 90% and 100% oxygen by volume.

The precalcinator 1 is a fluidised bed 13, the combustion gas 9 being the fluidisation gas. The facility may have, upstream from the precalcinator 1, means 100 for mixing the preheated materials with a fuel.

According to the example in FIG. 1, a pipe 12 may be used to route a portion of the air heated by the fired material in said clinker cooler 3 to the first cyclone preheater 5 so as to maintain a sufficient flow in said first preheater 5.

A calculated example of a facility according to the invention will now be described in detail.

The facility for manufacturing clinker in question is a medium-sized clinker production plant representing the capacity of a large number of existing plants, producing 4000 tonnes of clinker per day from a raw material output of 270 tonnes per hour.

According to one preferred embodiment of this example, the operation thereof is described as follows.

The facility consumes 3200 kJ/kg of clinker, which is a normal consumption value. The fuel is oil coke.

In the furnace, 35.2% of the fuel is consumed, which is burned with 59,670 $Nm^3$/hr of "second area" air at 1180° C. produced in said clinker cooler.

The fumes produced are directed into a five-cyclone stage preheater (first preheater 5) supplied with 63.7% of the dust, i.e. 172 t/hr. A flow rate of 76,830 Nm³/hr of hot air at 400° C. from the cooler is also directed into the first preheater 5, via the pipe 12. The total gases circulating in the first preheater 5 make it possible to provide a material to gas mass ratio of 0.8 kg/kg, and obtain suitable aeraulic operation. The fumes are released at 280° C. from the preheater.

The material is decarbonated in a precalcinator 1 operating in a fluidised bed, receiving 64.8% of the fuel. Combustion is carried out by 98% pure oxygen, simultaneously acting as the fluidisation gas for the fluidised bed. The oxygen flow rate is 22,000 Nm³/hr.

The fume flow rate, generated by the combustion of the fuel and by the decarbonation of the materials, i.e. 64,000 Nm³/hr, is directed into a cyclone preheater (second cyclone preheater 7) receiving 36.3% of the dust, i.e. 98 t/hr. The material to fume mass ratio is 0.8 kg/kg, ensuring suitable aeraulic operation and an optimal heat exchange. The fumes leave the second preheater 7 at 300° C. The composition of the fumes released by the second preheater 7 is (by volume):

$CO_2$: 86.5%,
$N_2$: 1.0%
$O_2$: 2.9%
$H_2O$: 9.6%

These fumes contain 0.651 kg of $CO_2$ per kg of clinker, i.e. 75.1% of the total quantity generated in the firing plant, i.e. an output of 108,500 kg/hr of $CO_2$ in concentrated form. The $CO_2$ content after water condensation is up to 95.7%.

Naturally, further embodiments of the invention could have been envisaged by those skilled in the art, without leaving the scope of the invention defined by the claims hereinafter.

The invention claimed is:

1. A method for manufacturing cement clinker in a facility comprising:
a first cyclone preheater (5) and a second cyclone preheater (7) for preheating first (4) and second (6) portions of a raw material, respectively,
a precalcinator (1) using a combustion gas (9) for burning a solid fuel, the fumes (8) released by said precalcinator (1) being directed to said second cyclone preheater (7),
a rotary furnace (2) provided with a fuel burner, the fumes (18) released by the rotary furnace (2) being directed to the first cyclone preheater (5), said first cyclone preheater (5) and second cyclone preheater (7) being independent so that fumes from the kiln and fumes from the precalcinator do not mix, and
a clinker cooler (3) that blows a cooling gas across the clinker at the outlet of said rotary furnace (2),
wherein said method comprises:
reheating the first portion (4) of raw material in the first cyclone preheater (5);
preheating the second portion (6) of raw material in the second cyclone preheater (7);
pre-roasting the totality of the first preheated portion of raw material (41) and the second preheated portion of raw material (61) in the precalcinator (1) with said solid fuel and said combustion gas (9) before firing the pre-roasted materials in the rotary furnace (2) and cooling the fired materials in said clinker cooler (3),
said combustion gas (9) in the precalcinator (1) containing between 90% and 100% oxygen by volume, the precalcinator (1) being a fluidised bed (13), the fluidisation gas being said combustion gas,
said solid fuel having a grain size of greater than or equal to 1 mm, in part or whole, and
the materials (4, 6) being pre-roasted in the precalcinator (1), without recycling fumes in said precalcinator (1) in order to concentrate carbon dioxide in the fumes from the second cyclone preheater (7), the carbon dioxide concentration being greater than 75% by volume.

2. The method according to claim 1, wherein the solid fuel (10) in the precalcinator (1) is mixed with the preheated materials (61) before introducing said preheated materials (61) into said precalcinator (1).

3. The method according to claim 1, wherein the fluidisation gas velocity is less than 2 m/s.

4. The method according to claim 1, wherein the dwell time of the materials in the precalcinator (1) is greater than 1 minute and less than 20 minutes.

5. The method according to claim 1, wherein the carbon dioxide is captured from the fumes (11) at the outlet of the second cyclone preheater (7).

6. The method according to claim 1, wherein a portion of the air heated by the fired materials in said clinker cooler (3) is directed into said first cyclone preheater (5).

7. The method according to claim 1, wherein a portion of the fumes (11) from the second cyclone preheater (7) is used as a pneumatic transport fluid for the solid fuel.

8. The method according to claim 2, wherein the fluidisation gas velocity is less than 2 m/s.

9. The method according to claim 2, wherein the dwell time of the materials in the precalcinator (1) is greater than 1 minute and less than 20 minutes.

10. The method according to claim 2, wherein the carbon dioxide is captured from the fumes (11) at the outlet of the second cyclone preheater (7).

11. The method according to claim 2, wherein a portion of the air heated by the fired materials in said clinker cooler (3) is directed into said first cyclone preheater (5).

12. The method according to claim 2, wherein a portion of the fumes (11) from the second cyclone preheater (7) is used as a pneumatic transport fluid for the solid fuel or as a cleaning fluid in said second preheater (7).

13. The method according to claim 2, wherein the preheated material mixed with the solid fuel is the second preheated portion of raw material (61).

* * * * *